United States Patent
Kim et al.

(10) Patent No.: US 8,959,458 B2
(45) Date of Patent: Feb. 17, 2015

(54) MOBILE TERMINAL AND METHOD OF CONTROLLING THE MOBILE TERMINAL

(75) Inventors: Jonghwan Kim, Seoul (KR); Joohee Son, Seoul (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 12/876,998

(22) Filed: Sep. 7, 2010

(65) Prior Publication Data

US 2011/0059733 A1 Mar. 10, 2011

(30) Foreign Application Priority Data

Sep. 8, 2009 (KR) .................. 10-2009-0084606

(51) Int. Cl.
| | |
|---|---|
| *G06F 3/033* | (2013.01) |
| *H04M 1/725* | (2006.01) |
| *G06F 1/16* | (2006.01) |
| *G06F 3/01* | (2006.01) |
| *G06F 3/0482* | (2013.01) |

(52) U.S. Cl.
CPC ......... *H04M 1/72563* (2013.01); *G06F 1/1624* (2013.01); *G06F 1/1626* (2013.01); *G06F 3/011* (2013.01); *G06F 3/017* (2013.01); *G06F 3/0482* (2013.01); *H04M 1/72583* (2013.01)
USPC ........................................................ 715/863

(58) Field of Classification Search
CPC ................. G06F 2203/04808; G06F 3/0488; G06F 1/1626; H04M 1/72563
USPC .......................... 715/810, 863, 864
See application file for complete search history.

(56) References Cited

U.S. PATENT DOCUMENTS

| | | | |
|---|---|---|---|
| 2006/0094480 A1* | 5/2006 | Tanaka .................. | 455/575.1 |
| 2006/0229107 A1* | 10/2006 | Cho et al. .................. | 455/566 |
| 2007/0067439 A1* | 3/2007 | Mason et al. ............... | 709/224 |
| 2007/0083911 A1* | 4/2007 | Madden et al. ............. | 725/135 |
| 2008/0030360 A1* | 2/2008 | Griffin ..................... | 340/689 |
| 2008/0045207 A1* | 2/2008 | Ahn et al. .................. | 455/428 |
| 2008/0183313 A1 | 7/2008 | Lundquist | |
| 2008/0207271 A1* | 8/2008 | Krutik et al. ............... | 455/566 |
| 2008/0256492 A1* | 10/2008 | Yamamoto et al. .......... | 715/856 |
| 2009/0104943 A1* | 4/2009 | Park et al. .................. | 455/566 |
| 2010/0011304 A1* | 1/2010 | van Os ..................... | 715/762 |
| 2011/0053577 A1* | 3/2011 | Lee et al. ................... | 455/418 |

FOREIGN PATENT DOCUMENTS

EP 1 983 730 A1 10/2008

* cited by examiner

*Primary Examiner* — Rashawn Tillery
(74) *Attorney, Agent, or Firm* — Birch, Stewart, Kolasch & Birch, LLP

(57) ABSTRACT

A method of controlling a mobile terminal, and which includes displaying, on a display module of the mobile terminal, a first screen corresponding to a current operating mode and including a plurality of objects relevant to the current operating; receiving an input signal indicating a screen reconfiguration event has occurred on the mobile terminal, the screen reconfiguration event including at least one of a predefined movement of a main body of the mobile terminal and a blow signal being obtained by blowing onto the mobile terminal; and reconfiguring, via a controller on the mobile terminal, the first screen by removing at least one of the plurality of objects that do not meet a predefined screen reconfiguration condition from the first screen, and displaying a second screen obtained by the reconfiguration of the first screen on the display module based on the received input signal.

28 Claims, 16 Drawing Sheets

(a)          (b)

(a)   (b)

(a)          (b)

(a)  (b)

MOBILE TERMINAL AND METHOD OF CONTROLLING THE MOBILE TERMINAL

CROSS-REFERENCE TO A RELATED APPLICATION

This application claims the priority benefit of Korean Patent Application No. 10-2009-0084606, filed on Sep. 8, 2009 in the Korean Intellectual Property Office, the disclosure of which is incorporated herein by reference.

BACKGROUND OF THE INVENTION

1. Field of the Invention

The present invention relates to a mobile terminal and corresponding method for reconfiguring information displayed on the mobile terminal based on a screen reconfiguration event.

2. Description of the Related Art

Mobile terminals are portable devices capable of performing voice/video calls, inputting and outputting information, and/or storing data. Mobile terminals have also been equipped with various complicated functions such as capturing photos and moving images, playing music files and moving image files, providing games, receiving broadcast programs, and providing wireless Internet services, and thus function as multifunctional multimedia players.

Because of the various functions on the mobile terminal, the mobile terminals include a user interface (UI) environment allowing users to easily search for and choose desired functions. Some mobile terminals include a double-sided liquid crystal display (LCD) or a full touch screen, for example. However, because the terminal is small in size, the amount of display space for displaying the UI environment is also limited. Thus, the mobile terminal is not always easy to operate.

SUMMARY OF THE INVENTION

Accordingly, one object of the present invention is to address the above-noted and other problems.

Another object of the present invention is to provide a mobile terminal and corresponding method for reconfiguring a screen displayed on a display module of the mobile terminal based on a screen reconfiguration event by removing objects from the display module that do not meet a predefined screen reconfiguration condition.

To achieve these and other advantages and in accordance with the purpose of the present invention, as embodied and broadly described herein, the present invention provides in one aspect a method of controlling a mobile terminal, and which includes displaying, on a display module of the mobile terminal, a first screen corresponding to a current operating mode and including a plurality of objects relevant to the current operating; receiving an input signal indicating a screen reconfiguration event has occurred on the mobile terminal, the screen reconfiguration event including at least one of a predefined movement of a main body of the mobile terminal and a blow signal being obtained by blowing onto the mobile terminal; and reconfiguring, via a controller on the mobile terminal, the first screen by removing at least one of the plurality of objects that do not meet a predefined screen reconfiguration condition from the first screen, and displaying a second screen obtained by the reconfiguration of the first screen on the display module based on the received input signal.

In another aspect, the present invention provides a mobile terminal including a display module configured to display a first screen corresponding to a current operating mode and including a plurality of objects relevant to the current operating; an input unit configured to receive an input signal indicating a screen reconfiguration event has occurred on the mobile terminal, said screen reconfiguration event including at least one of a predefined movement of a main body of the mobile terminal and a blow signal being obtained by blowing onto the mobile terminal; and a controller configured to reconfigure the first screen by removing at least one of the plurality of objects that do not meet a predefined screen reconfiguration condition from the first screen, and to control the display module to display a second screen obtained by the reconfiguration of the first screen on the display module based on the received input signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown. Further, the term 'mobile terminal' as used herein may indicate a mobile phone, a smart phone, a laptop computer, a digital broadcast receiver, a personal digital assistant (PDA), a portable multimedia player (PMP), a navigation device and the like. In this disclosure, the terms 'module' and 'unit' can be used interchangeably.

Figure 1:
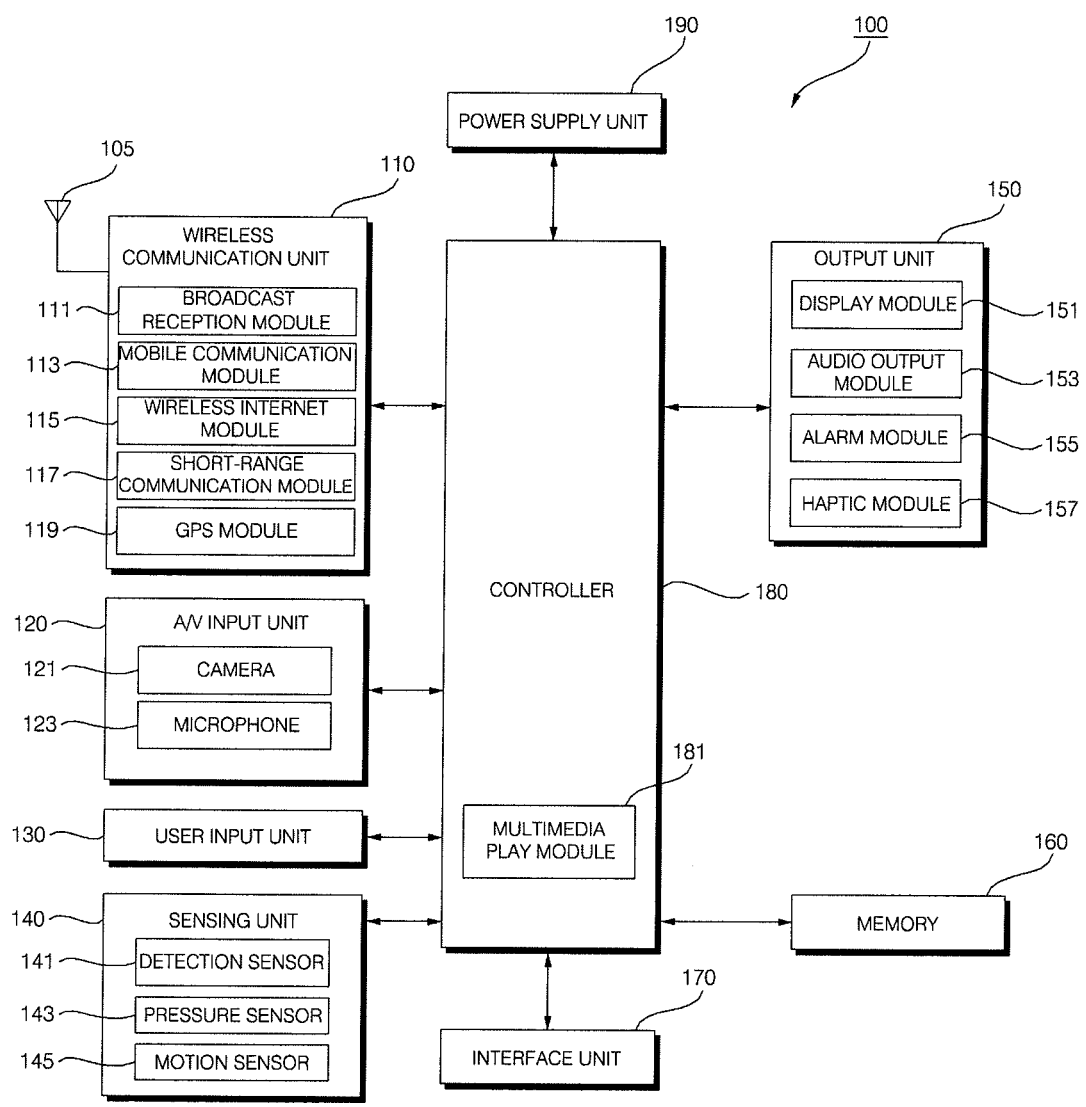
FIG. 1 is a block diagram illustrating a mobile terminal according to an embodiment of the present invention.

First, FIG. 1 is a block diagram illustrating a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. In addition, two or more of the elements may be combined into one element, or one element may be divided into two or more elements, if appropriate.

Further, in the embodiment in FIG. 1, the wireless communication unit 110 includes a broadcast reception module 111, a mobile communication module 113, a wireless Internet module 115, a short-range communication module 117, and a global positioning system (GPS) module 119. The broadcast reception module 111 receives broadcast signals and/or broadcast-related information from an external broadcast management server through a broadcast channel. Further, the broadcast channel may be a satellite channel or a terrestrial channel. Also, the broadcast management server may be a server which generates broadcast signals and/or broadcast-related information and transmits the generated broadcast signals and/or the generated broadcast-related information, or may be a server which receives and then transmits previously-generated broadcast signals and/or previously-generated broadcast-related information.

In addition, the broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. Further, the broadcast-related information may be provided to the mobile terminal 100 through a mobile communication network. In this instance, the broadcast-related information may be received by the mobile communication module 113, rather than by the broadcast reception module 111. The broadcast-related information may also come in various forms.

In addition, the broadcast reception module 111 can receive broadcast signals using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 can also be stored in the memory 160.

In addition, the mobile communication module 113 can transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages. Further, the wireless Internet module 115 corresponds to a module for wirelessly accessing the Internet. The wireless Internet module 115 may also be embedded in the mobile terminal 100 or may be installed in an external device. The wireless Internet module 115 may also use various wireless Internet technologies such as the wireless local area network (WLAN), Wireless Broadband (WiBro), World Interoperability for Microwave Access (Wimax), and High Speed Downlink Packet Access (HSDPA).

In addition, the short-range communication module 117 corresponds to a module for short-range communication and may use various short-range communication techniques such as Bluetooth, radio frequency identification (RFID), infrared data association (IrDA), ultra wideband (UWB), and ZigBee. Further, the GPS module 119 can receive position information from a plurality of GPS satellites. Also, the A/V input unit 120 can be used to receive audio signals or video signals, and in FIG. 1 includes a camera 121 and a microphone 123.

In more detail, the camera 121 processes various image frames such as still images or moving images captured by an image sensor during a video call mode or an image capturing mode. The image frames processed by the camera 121 can also be displayed by a display module 151 included in the output unit 150. Further, the image frames processed by the camera 121 may be stored in the memory 160 or may be transmitted to an external device through the wireless communication unit 110. The mobile terminal 100 may also include two or more cameras 121.

In addition, the microphone 123 can receive external (e.g., voice) sound signals during a call mode, a recording mode, or a voice recognition mode with the use of a microphone and can convert the sound signals into electrical sound data. In the call mode, the mobile communication module 113 converts the electrical sound data into data that can be readily transmitted to a mobile communication base station and then outputs the data obtained by the conversion. The microphone 123 may also use various noise removal algorithms to remove noise that may be generated during the reception of external sound signals.

In addition, the user input unit 130 can generate key input data based on user input for controlling the operation of the mobile terminal 100. The user input unit 130 may be implemented as a keypad, a dome switch, a touch pad (static pressure/static voltage), a jog wheel, a jog switch, etc. In particular, if the user input unit 130 is implemented as a touch pad and forms a mutual layer structure with the display module 151, the user input unit 130 and the display module 151 may be collectively referred to as a touch screen.

Further, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device.

Further, in the embodiment in FIG. 1, the sensing unit 140 includes a proximity sensor 141, a pressure sensor 143 and a motion sensor 145. The proximity sensor 141 can detect an approaching object or whether there is an object nearby the mobile terminal 100 without mechanical contact. More specifically, the proximity sensor 141 can detect an approaching object based on a change in an alternating current (AC) magnetic field or a static magnetic field, or the rate of change of capacitance. The sensing unit 140 may also include two or more proximity sensors 141.

In addition, the pressure sensor 143 can determine whether pressure is being applied to the mobile terminal 100 and/or measure the level of pressure, if any, applied to the mobile terminal 100. The pressure sensor 143 may also be installed in a certain part of the mobile terminal 100 where the detection of pressure is needed. For example, the pressure sensor 143 may be installed in the display module 151. In this instance, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

Further, the motion sensor 145 can determine the location and motion of the mobile terminal 100 using an acceleration sensor or a gyro sensor. In more detail, acceleration sensors are a type of device for converting a vibration in acceleration into an electric signal. With recent developments in microelectromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some instances when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate. Further, gyro sensors are sensors for measuring angular velocity, and can determine the relative direction of the rotation of the mobile terminal 100 to a reference direction.

In addition, the output unit 150 can output audio signals, video signals and alarm signals. In the embodiment in FIG. 1, the output unit 150 includes the display module 151, an audio output module 153, an alarm module 155 and a haptic module 157. The display module 151 can display various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a UI or a GUI for capturing or receiving images.

Further, if the display module 151 and the user input unit 130 form a mutual layer structure and are thus implemented as a touch screen, the display module 151 can be used as both an output device and an input device. If the display module 151 is implemented as a touch screen, the display module 151 can also include a touch screen panel and a touch screen panel controller. In more detail, the touch screen panel is a transparent panel attached onto the exterior of the mobile terminal 100 and may be connected to an internal bus of the mobile terminal 100.

The touch screen panel keeps monitoring whether the touch screen panel is being touched by the user, and once a touch input to the touch screen panel is received, the touch screen panel transmits a number of signals corresponding to the touch input to the touch screen panel controller. The touch screen panel controller then processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

Further, the display module 151 may include electronic paper (e-paper), which is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules, for example.

In addition, the display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Further, the audio output module 153 can output audio data received by the wireless communication unit 110 during a call reception mode, a call mode, a recording mode, a voice recognition mode, or a broadcast reception mode and/or output audio data present in the memory 160. In addition, the audio output module 153 can output various sound signals associated with the functions of the mobile terminal 100 such as receiving a call or a message. The audio output module 153 may also include a speaker and a buzzer.

Also, the alarm module 155 can output an alarm signal indicating the occurrence of an event in the mobile terminal 100. Examples of the event include receiving a call signal, receiving a message, and receiving a key signal. Examples of the alarm signal output by the alarm module 155 also include an audio signal, a video signal and a vibration signal. More specifically, the alarm module 155 can output an alarm signal upon receiving a call signal or a message. In addition, the alarm module 155 can receive a key signal and output an alarm signal as feedback to the key signal. Therefore, the user can easily recognize the occurrence of an event based on an alarm signal output by the alarm module 155. Further, an alarm signal for notifying the user of the occurrence of an event may be output not only by the alarm module 155, but also by the display module 151 or the audio output module 153.

In addition, the haptic module 157 can provide various haptic effects (such as vibration) that can be perceived by the user. If the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects. Further, the haptic module 157 may provide various haptic effects other than vibration such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may also be configured to enable the user to recognize a haptic effect using the kinesthetic sense of the fingers or the arms. Also, the mobile terminal 100 may include two or more haptic modules 157.

In addition, the memory 160 can store various programs used for the operation of the controller 180, and temporarily store various data such as a list of contacts, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 can also operate a web storage on the Internet, which performs the functions of the memory 160.

Further, the interface unit 170 interfaces with an external device that can be connected to the mobile terminal 100. In more detail, the interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 can also receive data from an external device or be powered by an external device, and transmit data provided by an external device to other components in the mobile terminal 100 or transmit data provided by other components in the mobile terminal 100 to an external device. In addition, when the mobile terminal 100 is connected to an external cradle, the interface unit 170 provides a path for supplying power from the external cradle to the mobile terminal 100 or for transmitting various signals from the external cradle to the mobile terminal 100.

Further, the controller 180 controls the general operations of the mobile terminal 100. For example, the controller 180 can perform various control operations regarding making/receiving a voice call, transmitting/receiving data, or making/receiving a video call. In FIG. 1, the controller 180 also includes a multimedia player module 181, which plays multimedia data. The multimedia player module 181 may be implemented as a hardware device and may be installed in the controller 180. Alternatively, the multimedia player module 181 may be implemented as a software program.

In addition, the power supply unit 190 may be supplied with power by an external power source or an internal power source and supply power to the other components in the mobile terminal 100. The mobile terminal 100 may include a wired/wireless communication system or a satellite communication system and thus can operate in a communication system capable of transmitting data in units of frames or packets.

Next, the exterior of the mobile terminal 100 will be described in detail with reference to FIGS. 2 and 3. For convenience, the mobile terminal 100 is assumed to be a slider-type mobile terminal equipped with a touch screen. However, the present invention is not restricted to a slider-type mobile terminal. Rather, the present invention can be applied to various mobile phones other than a slider-type mobile terminal.

Figure 2:
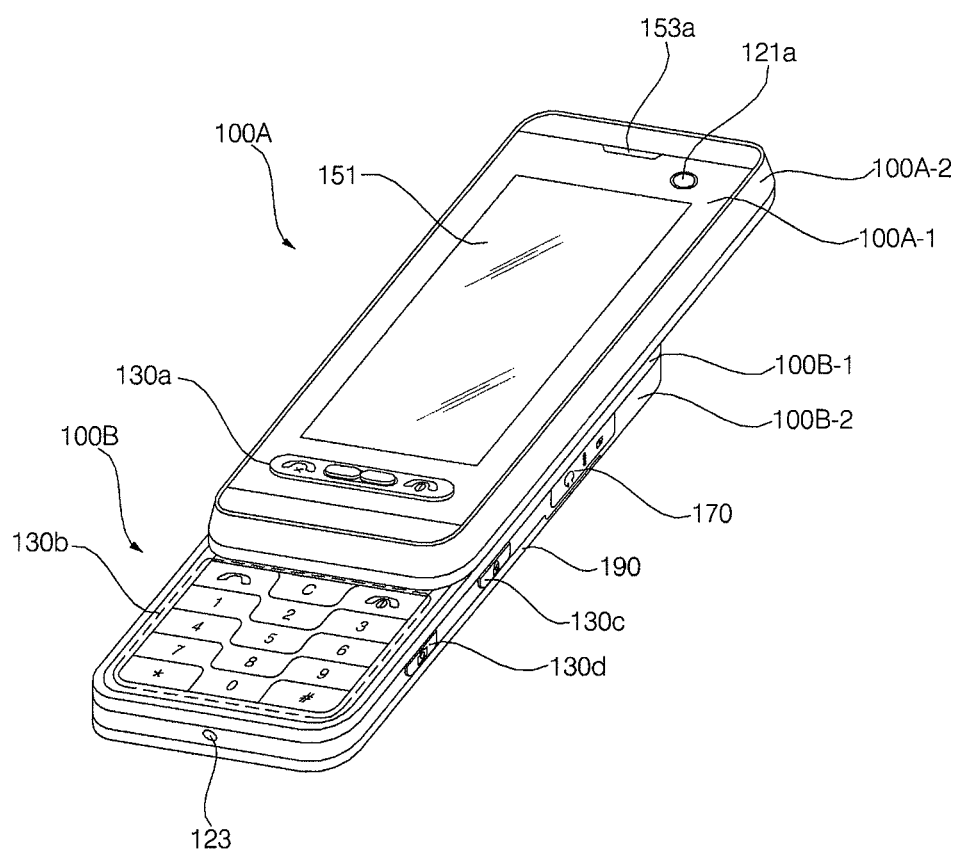
FIG. 2 is a front perspective view illustrating the mobile terminal shown in FIG. 1.

As shown, FIG. 2 is a front perspective view illustrating the mobile terminal 100 shown in FIG. 1. Referring to FIG. 2, the mobile terminal 100 includes a first body 100A and a second body 100B, which can slide up or down against the first body 100A. Also, when the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being opened.

When the mobile terminal 100 is closed, the mobile terminal generally operates in a standby mode and can be released from the standby mode in response to user manipulation. On the other hand, when the mobile terminal 100 is opened, the mobile terminal 100 generally operates in a call mode and can be switched to the standby mode either manually in response to user manipulation or automatically after the lapse of a predefined amount of time.

Referring to FIG. 2, the exterior of the first body 100A is defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. Further, the first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

Also, as shown, the display module 151, a first audio output module 153a, a first camera 121a and a first user input module 130a are disposed in the front case 100A-1. Examples of the display module 151 include an LCD and an OLED which can visualize information. Since a touch pad is configured to overlap the display module 151 and thus to form a mutual layer structure, the display module 151 serves as a touch screen. Thus, it is possible for the user to input various information to the mobile terminal 100 simply by touching the display module 151.

The exterior of the second body 100B may also be defined by a second front case 100B-1 and a second rear case 100B-2. A second user input module 130b is also disposed in the second body 100B, and particularly, at the front of the second front case 100B-1. Third and fourth user input modules 130c and 130d, the microphone 123 and the interface unit 170 are also provided in the second front case 100B-1 or the second rear case 100B-2. Further, the first through fourth user input modules 130a through 130d may be collectively referred to as the user input unit 130. The user input unit 130 may also adopt various manipulation methods including offering tactile feedback to the user.

In addition, the first user input module 130a allows the user to input various commands such as 'start', 'end', and 'scroll' to the mobile terminal 100, the second user input module 130b can be used to input various numerals, characters or symbols, and the third and fourth user input modules 130c and 130d can be used as hot keys for activating certain functions of the mobile terminal 100.

The microphone 123 is also configured to properly receive the user's voice or other sounds, and the interface unit 170 serves as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

Figure 3:
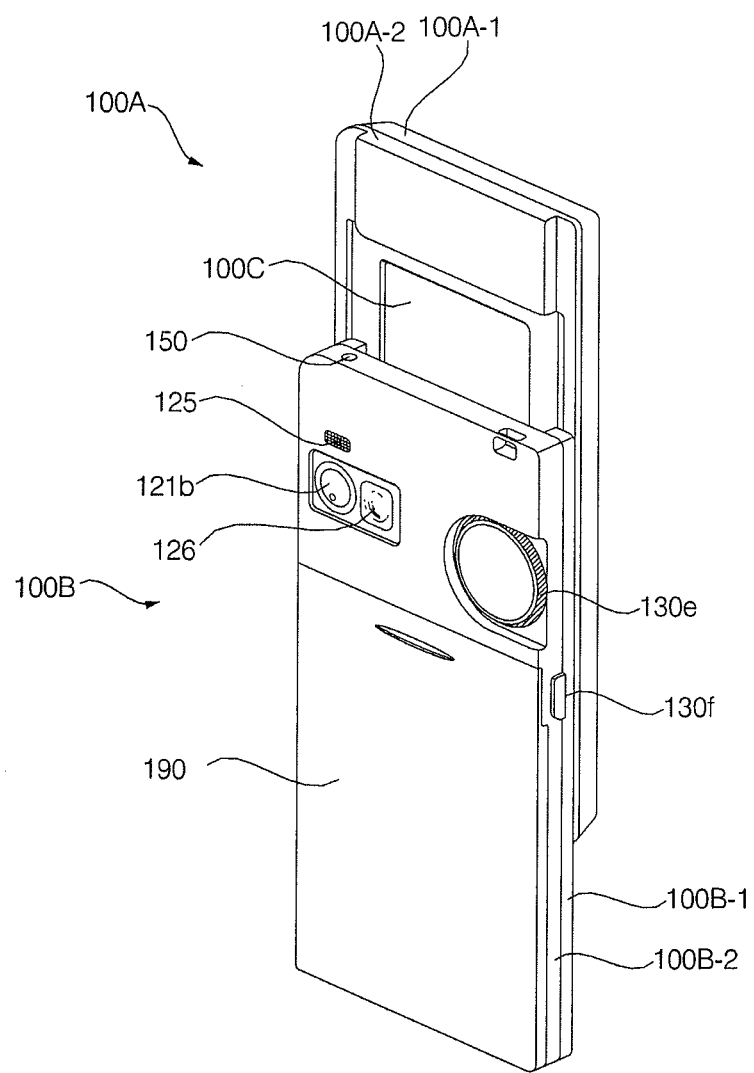
FIG. 3 is a rear perspective view illustrating the mobile terminal shown in FIG. 2.

Next, FIG. 3 is a rear perspective view illustrating the mobile terminal 100 shown in FIG. 2. Referring to FIG. 3, a fifth user input module 130e, which is of a wheel type, and a second camera 121b are disposed at the rear of the second rear case 100B-2 of the second body 100B, and a sixth user input module 130f is disposed on one side of the second body 100B. In addition, the second camera 121b may have a different photographing direction from that of the first camera 121a shown in FIG. 2. The first and second cameras 121a and 121b may also have different resolutions.

For example, the first camera 121a may be used to capture and then transmit an image of the face of the user during a video call. Thus, a low-resolution camera may be used as the first camera 121a. In addition, the second camera 121b may be used to capture an image of an ordinary subject. In this instance, the image captured by the second camera 121b may not need to be transmitted. Thus, a high-resolution camera may be used as the second camera 121b. A camera flash 125 and a mirror 126 are also disposed near the second camera 121*b*. In more detail, the cameral flash 125 may be used to illuminate a subject when the user attempts to capture an image of the subject with the second camera 121*b*, and the user can use the mirror 126 when taking a self portrait.

A second audio output module may also be provided in the second rear case 100B-2. Thus, the second audio output module can realize a stereo function along with the first audio output module 153*a*. The second audio output module may also be used in a speaker-phone mode. In addition, an antenna for receiving a broadcast signal may be disposed on one side of the second rear case 100B-2, and be installed so as to be able to be pulled out of the second rear case 100B-2.

As shown in FIG. 3, the slide module 100C is partially exposed on the first rear case 100A-2 of the first body 100A. The slide module 100C also couples the first body 100A and the second body 100B such that the first body 100A and the second body 100B can slide up and down against each other. A portion of the slide module 100C is hidden from view by the second front case 100B-1 of the second body 100B, and thus may not be exposed.

In addition, the second camera 121*b* and the other elements that have been described as being provided on the rear case 100A-2 can also be provided on the front case 100A-1. In addition, the first camera 121*a* can be configured to be rotatable and thus to cover the photographing direction of the second camera 121*b*. In this instance, the second camera 121*b* may be optional. Further, the power supply unit 190 is disposed in the rear case 100A-2, and may be a rechargeable battery and be coupled to the rear case 100A-2 so as to be attachable to or detachable from the rear case 100A-2.

Figure 4:
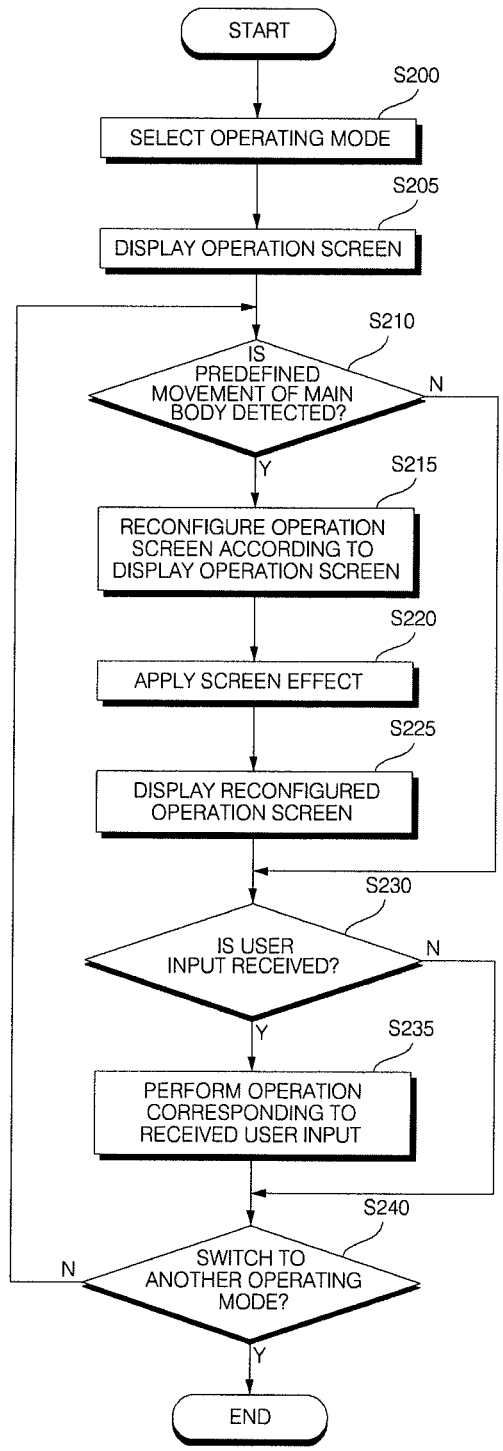
FIG. 4 is a flowchart illustrating a method of controlling a mobile terminal according to an embodiment of the present invention.

Next, FIG. 4 is a flowchart illustrating a method of controlling a mobile terminal according to an embodiment of the present invention. In this embodiment, the controller 180 can detect a predefined movement of the main body of the mobile terminal 100 and reconfigure a screen based on the predefined movement. Referring to FIG. 4, if an operating mode such as mode for searching a contacts list, searching a call list, playing a multimedia file, and viewing a broadcast program is selected (S200), the controller 180 displays an operation screen corresponding to the selected operating mode on the display module 151 (S205).

Thereafter, the controller 180 determines whether a predefined movement of the main body of the mobile terminal 100, which is classified as a screen reconfiguration event, has been detected (S210). Examples of the predefined movement of the main body of the mobile terminal 100 include tilting the main body of the mobile terminal 100, reversing the main body of the mobile terminal 100 and shaking the main body of the mobile terminal 100. Further, the controller 180 can determine whether the screen reconfiguration event has occurred based on the degree and direction of tilting of the main body of the mobile terminal 100, the pattern of the movement of the main body of the mobile terminal 100 and the intensity of the movement of the main body of the mobile terminal 100. Alternatively, if the display module 151 is touched and the main body of the mobile terminal 100 is moved in a certain manner, the controller 180 can determine that the screen reconfiguration event has occurred. A movement of the main body of the mobile terminal 100 may also be detected based on a variation in a sensing signal output by the motion sensor 145.

Thereafter, if the controller 180 determines that the predefined movement of the main body of the mobile terminal 100 has been detected (Yes in S210), the controller 180 determines that the screen reconfiguration event has occurred, and reconfigures the operation screen by removing objects that do not meet a predefined screen reconfiguration condition set in advance from the operation screen (S215). In addition, objects that can be displayed on the operation screen may be icons, images, contents and/or items of a list. Objects that meet the predefined screen reconfiguration condition may also be objects registered as Favorites, objects that meet a certain frequency-of-use, date, or time requirement, objects of a certain type, objects that meet a certain quantity or size requirement, objects associated with shortcut numbers, objects belonging to a certain group and/or objects that meet a certain shape or color requirement.

The reconfiguration of the operation screen may also include not only omitting objects that do not meet the predefined screen reconfiguration condition, but also adding objects that meet the predefined screen reconfiguration condition. For example, if the operation screen is a contacts list screen, a number of contacts that meet the predefined screen reconfiguration condition may be withdrawn from the memory 160 and then added to a contacts list currently being displayed on the contacts list screen.

Also, during the reconfiguration of the operation screen, the controller 180 can apply a predefined screen effect to the operation screen (S220). In addition to the screen effect, the controller 180 can apply a sound effect or a haptic effect to the operation screen. The screen effect or the haptic effect may also vary in accordance with the degree of the movement of the main body of the mobile terminal 100. Further, the reconfiguration of the operation screen may accompany the execution of a predefined function.

Once the operation screen is reconfigured, the controller 180 displays the reconfigured operation screen on the display module 151 (S225). The reconfigured operation screen may only include objects that meet the predefined screen reconfiguration condition. Then, if a user input such as a touch or key input is received (Yes in S230), the controller 180 executes an operation corresponding to the received user input (S235). Otherwise (No in S230), the method proceeds to operation S240. In addition, operations S210 through S235 may be performed repeatedly until the user wishes to switch the mobile terminal 100 to another operating mode (S240). In this manner, the controller 180 can reconfigure the operation screen upon the detection of the predefined movement of the main body of the mobile terminal 100 by removing objects that do not meet the predefined screen reconfiguration condition from the operation screen so that only the objects that meet the predefined screen reconfiguration condition can remain on the operation screen.

Figure 5:
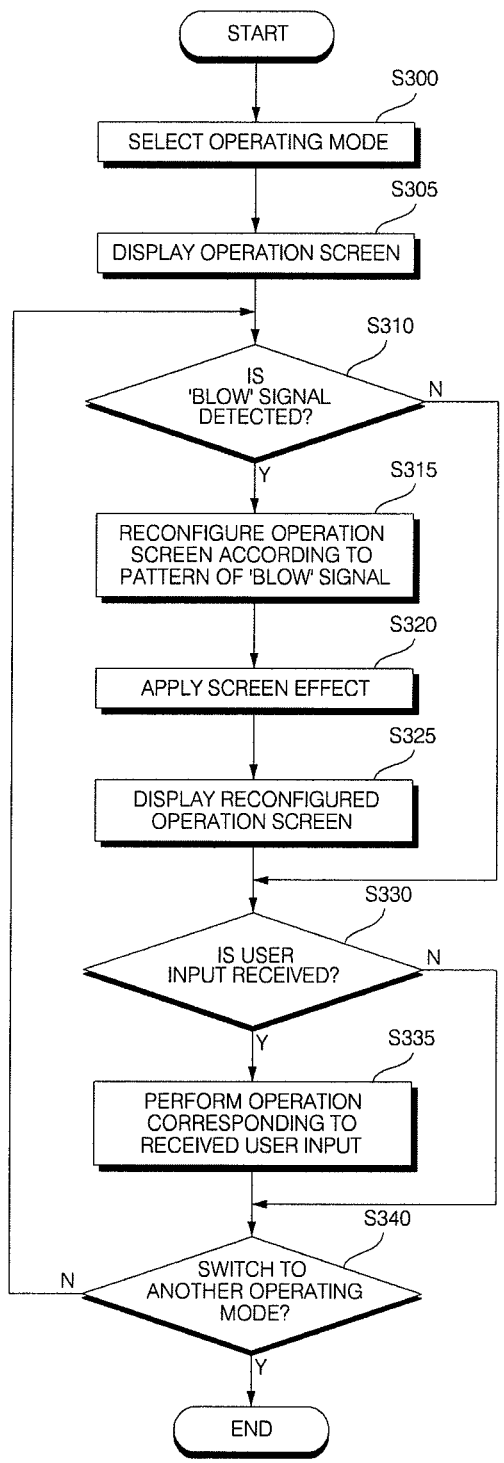
FIG. 5 is a flowchart illustrating a method of controlling a mobile terminal according to another embodiment of the present invention.

Next, FIG. 5 is a flowchart illustrating a method of controlling a mobile terminal according to another embodiment of the present invention. Operations S300, S305, and S320 through S340 of FIG. 5 are the same as their respective counterparts of FIG. 4, and thus, detailed descriptions thereof will be omitted. In this embodiment, unlike in the embodiment of FIG. 4, the controller 180 can determine whether a screen reconfiguration event has occurred based on whether a 'blow' signal, which is generated by blowing into the microphone 123 or a speaker of the mobile terminal 100, has been detected (S310).

A 'blow' signal can be detected by filtering an audio signal, if any, input to the microphone 123 or the speaker of the mobile terminal 100 and analyzing the waveform of the filtered audio signal. Different objects may then disappear from an operation screen or the speed of displaying a reconfigured operation screen may vary according to the pattern of a 'blow' signal such as intensity or length. That is, the controller 180 reconfigures the screen based on the blow signal (S315).

Further, in this embodiment, the controller 180 can reconfigured an operation screen by leaving only objects that meet a predefined screen reconfiguration condition on the operation screen in response to the input of a 'blow' signal. In addition, a 'blow' signal may be applied not only to the reconfiguration of an operation screen, but also to the adjustment of a background screen, the change of the theme of the background screen, the taking of photos, the measurement of breathing capacity, and mobile games.

Figure 6:
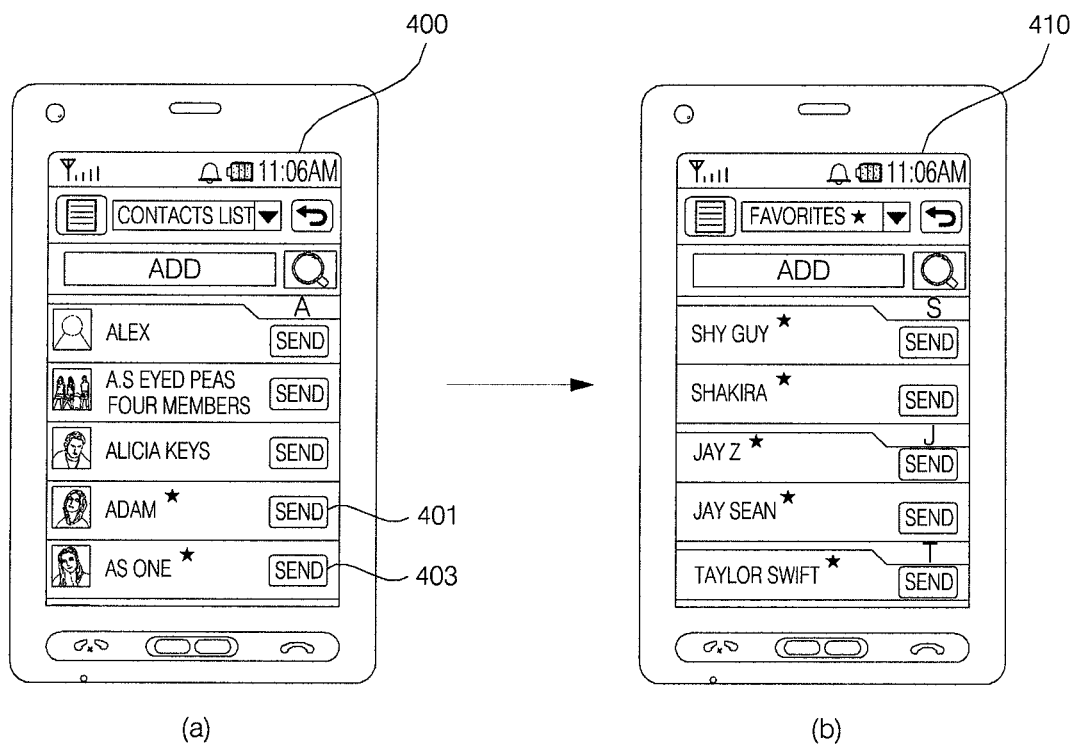
FIGS. 6-16 are diagrams of displays screens for explaining the embodiments of FIGS. 4 and 5.

Next, FIGS. 6-16 are diagrams of display screens for explaining the embodiments of FIGS. 4 and 5. Referring to FIG. 6(*a*), if the controller 180 detects a predefined movement of the main body of the mobile terminal 100, the controller 180 reconfigures a contacts list screen 400 by removing the contacts that are not set as Favorites from the contacts list screen 400. That is, as shown in FIG. 6(*b*), the controller 180 displays a contacts list screen 410 only including the contacts set as Favorites (☆).

Further, embodiments of the present invention can also be applied to a call list screen or a multimedia playlist screen in addition to the contacts screen. That is, if the user shakes the mobile terminal 100 or blows onto the mobile terminal 100 in a predefined manner when a call list screen or a multimedia playlist screen is displayed on the display module 151, the controller 180 can reconfigure the call list screen or the multimedia playlist screen such that only the items set as Favorites remain thereon.

The reconfiguration of a screen may also be performed in various manners according to how many times the mobile terminal 100 is moved in a predefined manner. For example, if the mobile terminal 100 is shaken less than three times, the controller 180 can display a list of calls made or received five times or more a week on the display module 151. On the other hand, if the mobile terminal 100 is shaken three times or more, the controller 180 can display a list of calls made or received ten times or more a week on the display module 151. Thus, if the mobile terminal 100 is shaken a number of times, the controller 180 can display a list of frequent calls on the display module 151. A similar concept applies to the blow signal.

Alternatively, the controller 180 can display list of calls made or received ten times or more a week when the mobile terminal 100 is shaken less than three times, and display the list of calls made or received five times or more a week on the display module 151 when the mobile terminal 100 is shaken three times or more. In this manner, the user can readily access a list of more frequent calls with less movement of the mobile terminal 100.

As another example, if the mobile terminal 100 is shaken less than three times when a multimedia playlist screen is displayed on the display module 151, the controller 180 can display a list of multimedia files with a user preference level of 3 or higher. On the other hand, if the mobile terminal 100 is shaken three times or more, the controller 180 can display a list of multimedia files with a user preference level of lower than 3.

The reconfiguration of a screen may be performed in various manners according to the speed or amount of the movement of the mobile terminal 100. By moving the mobile terminal 100 in a predefined manner after the reconfiguration of a screen upon the occurrence of a screen reconfiguration event, the controller 180 can return the mobile terminal 100 to its original screen state before the occurrence of the screen reconfiguration event. The reconfiguration of a screen may also be performed during the execution or display of a predetermined application. As a result, the controller 180 can display a new list associated with the predetermined application on the predetermined application or make disappear an existing list displayed on the predetermined application.

In more detail, the reconfiguration of a screen may be performed when an application and/or lists associated with the application are displayed. Then, the lists associated with the application may disappear from or appear back on the application as long as the execution or display of the application continues. If a screen reconfiguration event occurs when an idle screen is displayed, the controller 180 can display new menu lists on the idle screen or make existing menu lists displayed on the idle screen disappear. If objects are removed from an operation screen, the controller 180 can also display an additional option menu in an empty area on the operation screen.

As another example, the controller 180 can display a playlist including items with a user preference level of 3 or higher in response to a 'blow' signal with a first reference level or lower, and display a playlist including items with a user preference level of lower than 3 together with an existing playlist or replace the existing playlist in response to a 'blow' signal with the first reference level or higher. Alternatively, the controller 180 can display a playlist including the items with the user preference level of lower than 3 in response to a 'blow' signal with the first reference level or lower, and display the playlist including the items with the user preference level of 3 or higher in response to a 'blow' signal with the first reference level or higher.

In still another example, if a 'blow' signal is detected for less than a first reference time, the controller 180 can display the playlist including the items with the user preference level of 3 or higher. On the other hand, if a 'blow' signal is detected for more than the first reference time, the controller 180 can display the playlist including the items with the user preference level of lower than 3 together with an existing playlist or may be displayed replacing the existing playlist. Alternatively, if a 'blow' signal is detected for less than the first reference time, the controller 180 can display the playlist including the items with the user preference level of lower than 3. Also, if a 'blow' signal is detected for more than the first reference time, the controller 180 can display the playlist including the items with the user preference level of 3 or higher.

Figure 7:
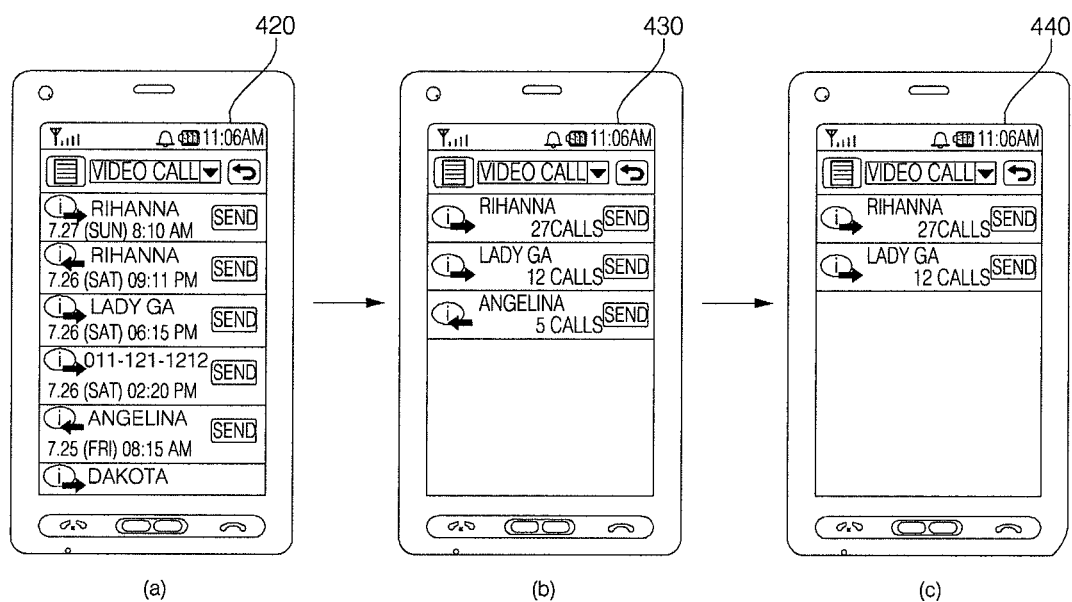

Next, referring to FIGS. 7(*a*) and 7(*b*), if a screen reconfiguration event occurs when a video call list screen 420 is displayed, the controller 180 can reconfigure the video call list screen 420 into a video call screen 430 showing a list of frequent calls that have been made or received a predefined number of times or more. The predefined number can also increase in accordance with the number of screen reconfiguration events occurred, as shown in FIG. 7(*c*).

In addition, the controller 180 can also reconfigure a contacts list screen, a call list screen or a message list screen upon the occurrence of a screen reconfiguration event so that a list of frequent callers, frequent calls or frequent messages can be displayed in order of frequency. Also, as the number of screen reconfiguration events occurred increases, a screen reconfiguration condition may be modified accordingly. Thus, the user can easily access a list of objects or items with a higher priority with fewer screen reconfiguration events.

Figure 8:
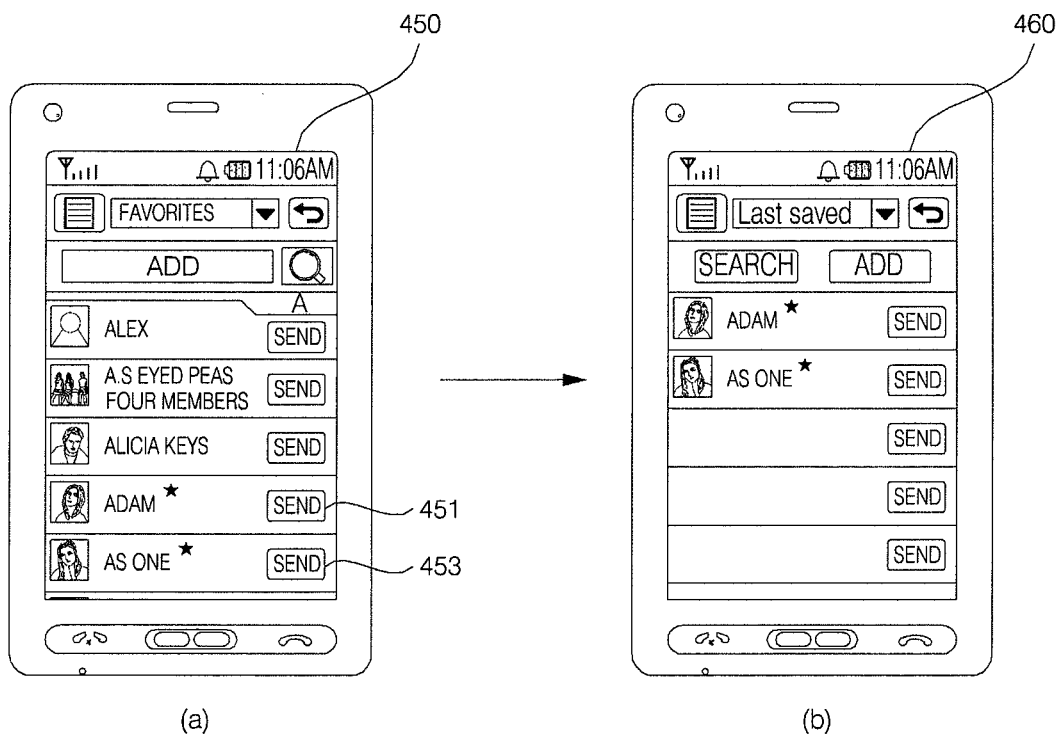
Figure 9:
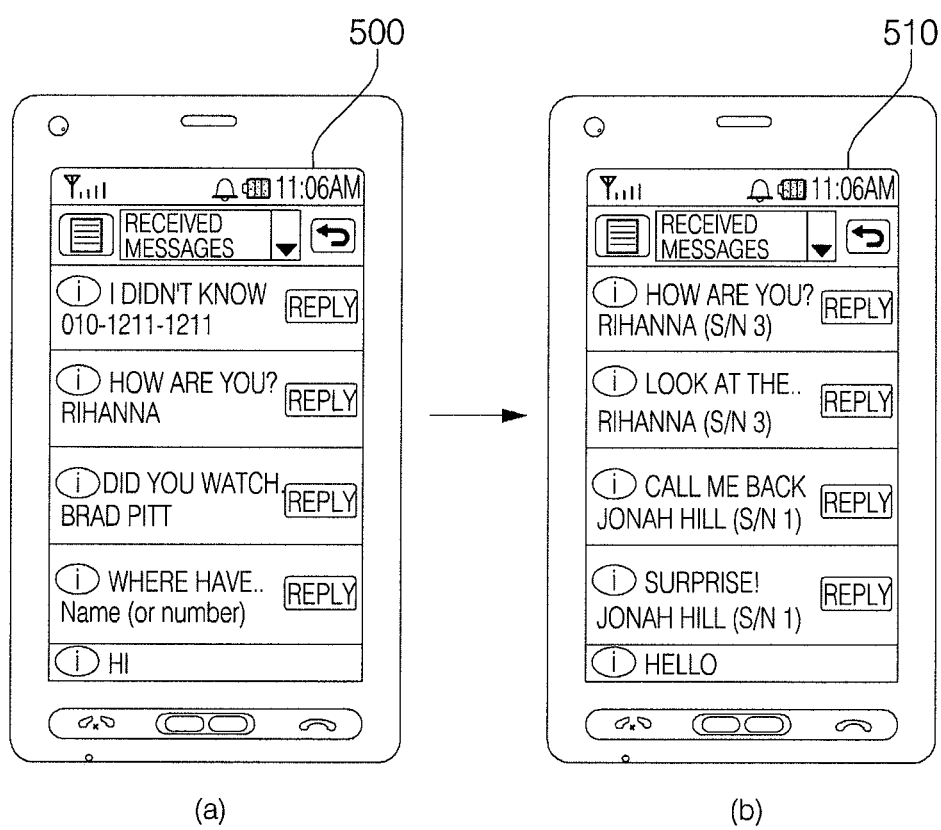
Figure 10:
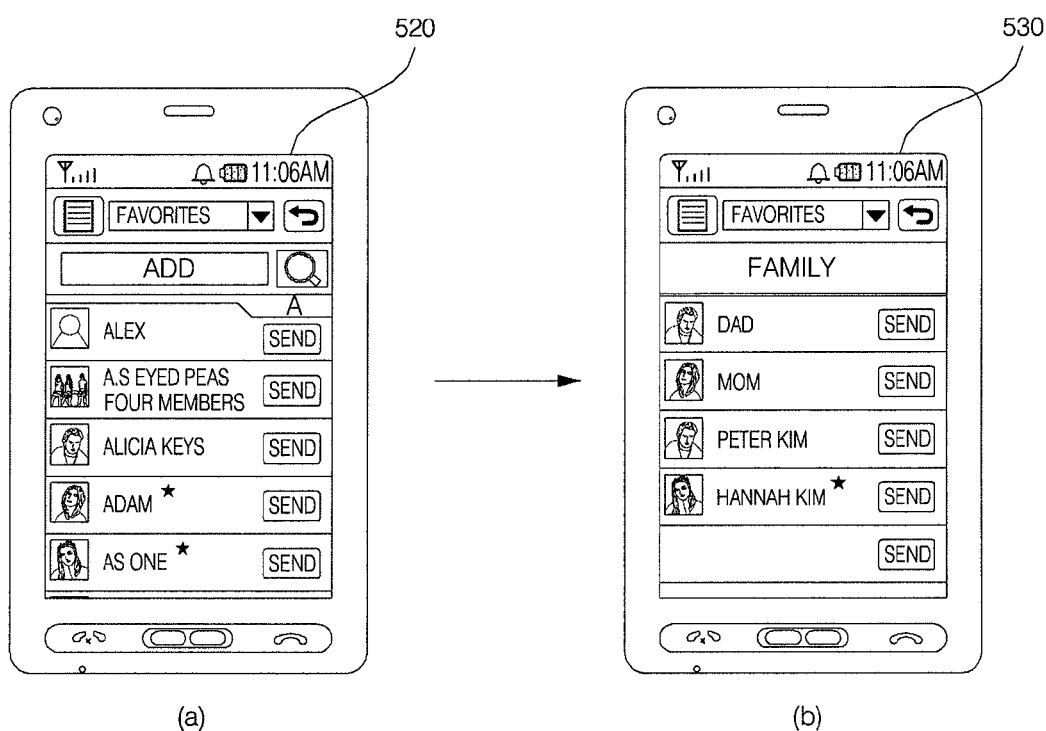
Figure 11:
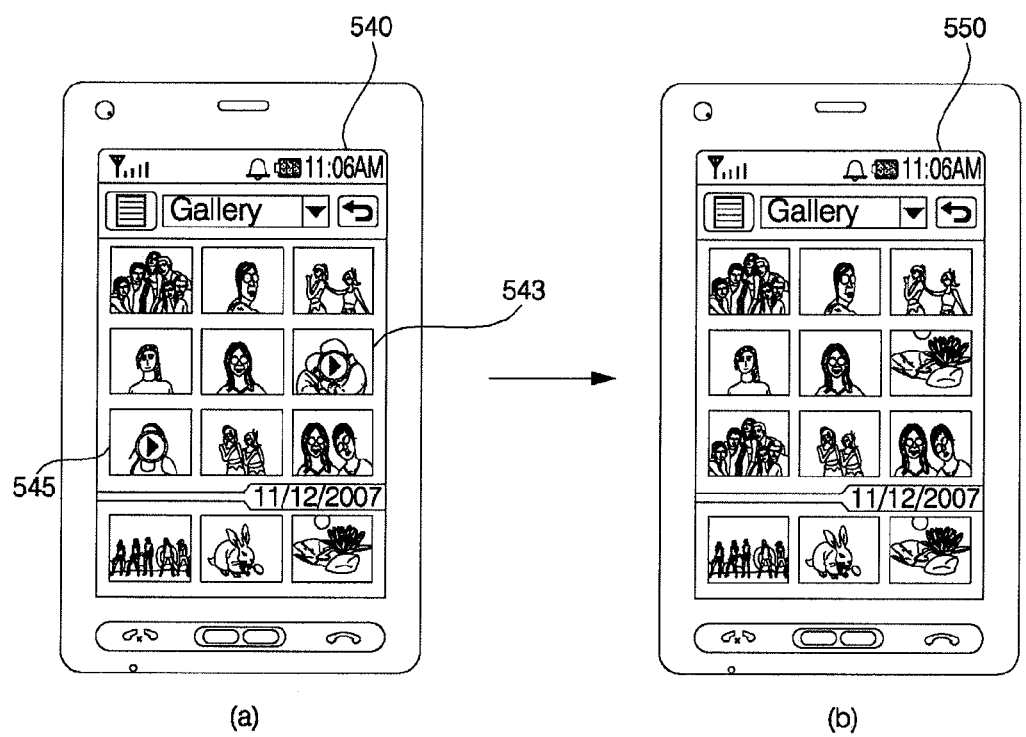
Figure 12:
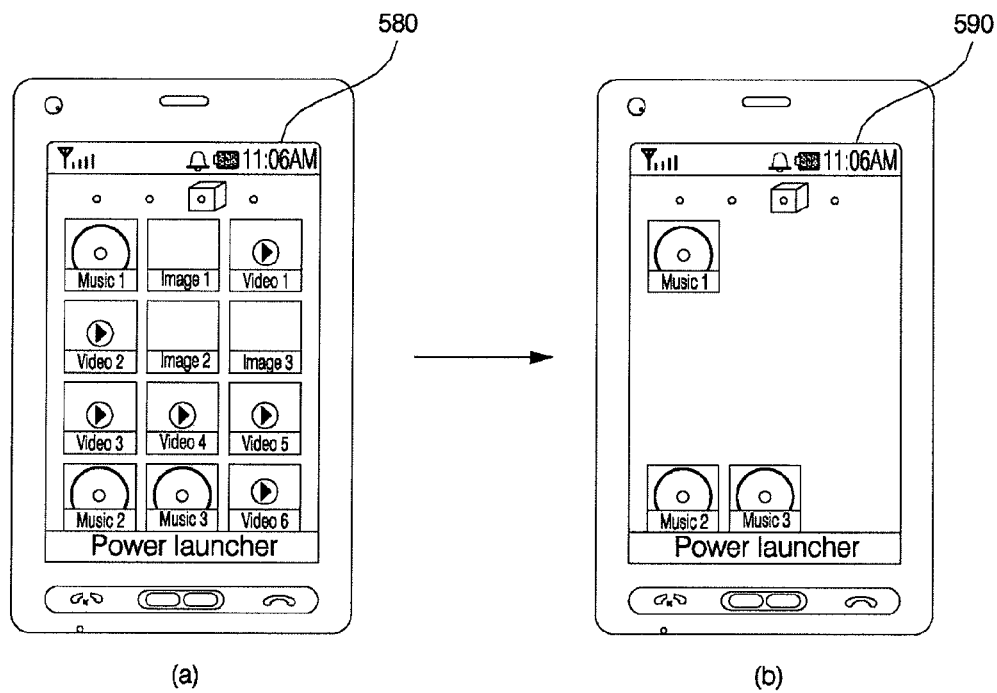
Figure 13:
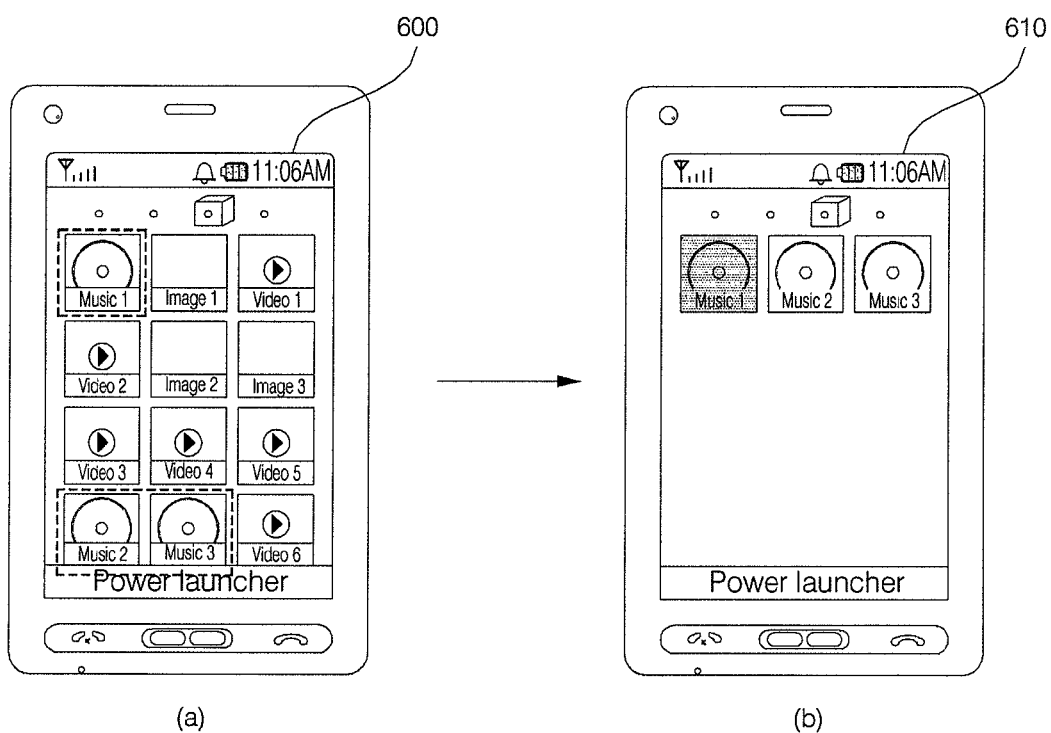
Figure 14:
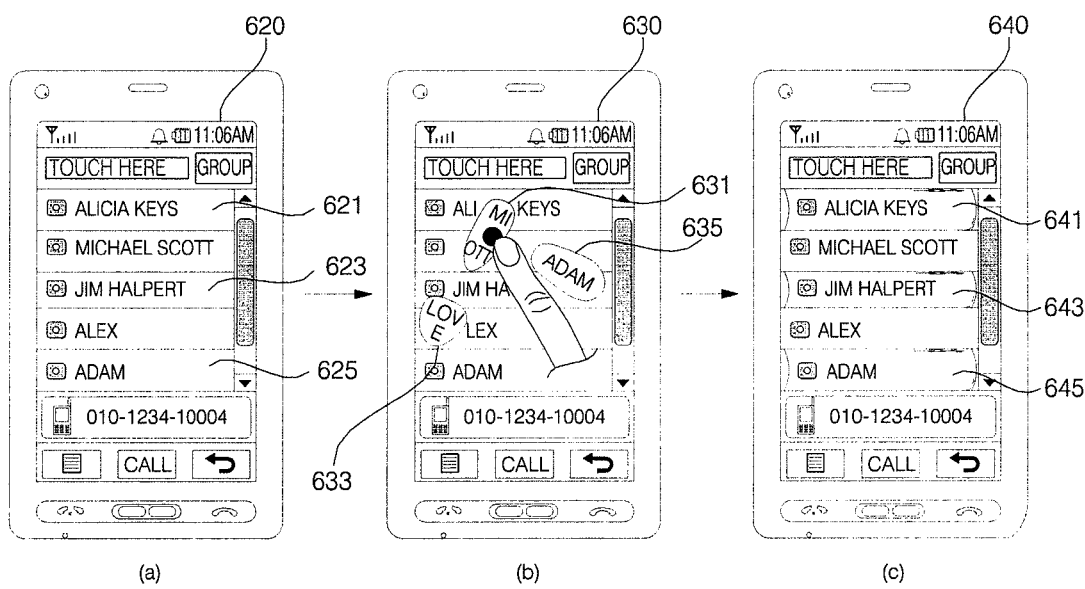

Referring to FIGS. 8(*a*) and 8(*b*), if a screen reconfiguration event occurs when a contacts list screen 450 is displayed, the controller 180 can reconfigure the contacts list screen 450 into a contacts list screen 460, which shows a list of most recently-added contacts. For example, as a result of the screen reconfiguration event, the controller 180 can display a list of contacts that were added a week or so ago or a month or so ago together with a list displayed on the contacts list screen 450 or replace the list displayed on the contacts list screen 450 according to the progress of the screen reconfiguration event.

Referring to FIGS. 9(a) and 9(b), if a screen reconfiguration event occurs when a 'Received Messages' screen 500 is displayed, the controller 180 can reconfigure the 'Received Messages' screen 500 into a 'Received Messages' screen 510 showing a list of received messages each received from a contact having a shortcut number allocated thereto. The controller 180 can also display a list of received messages corresponding to shortcut numbers of 10 to 20 or 20 to 100 together with a list of received messages displayed on the 'Received Messages' screen 500 or replace the list of received messages displayed on the 'Received Messages' screen 500 according to the progress of the screen reconfiguration event.

Referring to FIGS. 10(a) and 10(b), if a screen reconfiguration event occurs when a contacts list screen 520 is displayed, the controller 180 can reconfigure the contacts list screen 520 into a contacts list screen 530 showing a list of contacts classified into a predetermined group. That is, if a screen reconfiguration event occurs when a contacts list screen, a call list screen or a message list screen is displayed, the controller 180 can display a list of items each having a shortcut number attached thereto or a list of items classified into a predetermined group. The list displayed as the result of the screen reconfiguration event may also be displayed together with a list displayed on the contacts list screen, the call list screen or the message list screen or may be displayed by replacing the list displayed on the contacts list screen, the call list screen or the message list screen according to the progress of the screen reconfiguration event.

Thus, it is possible to reconfigure a screen upon the occurrence of a screen reconfiguration event so that only the objects that meet a predefined screen reconfiguration condition remain on the screen. In addition, it is possible to change the speed of reconfiguration of a screen according to the intensity of a screen reconfiguration event and the number of screen reconfiguration events occurred. As the result of a screen reconfiguration event, objects that do not meet a predefined screen reconfiguration condition can disappear from a screen, and at the same time, a sound effect or a vibration effect can be generated in order to alert the user to the disappearance of the objects.

For example, if a screen reconfiguration event such as a 'blow' signal or a shake of the mobile terminal 100 occurs when a contacts list screen showing a list of contacts is displayed, the controller 180 can sequentially delete the contacts that do not meet a predefined screen reconfiguration condition from the contacts list, accompanying a predetermined screen effect, and display the resulting contacts list or a contacts list obtained by rearranging the resulting contacts list in order of priority (such as frequency of occurrence). More specifically, the contacts that do not meet the predefined screen reconfiguration condition disappear from the contacts list, fading in or out of the contacts list.

Also, the controller 180 can display objects or items that do not meet a predefined screen reconfiguration condition using a visual effect such as being rolled up like a piece of paper upon the occurrence of a screen reconfiguration event. In this instance, certain information regarding the objects or items such as the priority levels of the objects or items or the frequency of occurrence of the objects or items may be displayed, instead of the objects or items.

Referring to FIGS. 11(a) and 11(b), if a screen reconfiguration event occurs when a thumbnail screen 540 showing the thumbnails of photos and videos 543 and 545 is displayed, the controller 180 can reconfigure the thumbnail screen 540 into a thumbnail screen 550 showing only the thumbnails of the photos. In this manner, it is possible to effectively reconfigure a screen on a content-type or content-size basis.

Referring to FIGS. 12(a) and 12(b), if a screen reconfiguration event occurs when a screen 580 showing a plurality of icons is displayed, the controller 180 can reconfigure the icon screen 580 into a screen 590 including only some of the plurality of icons that meet a predefined screen reconfiguration condition such as a certain size, shape and color requirement. Referring to FIGS. 13(a) and 13(b), the controller 180 can reconfigure a screen 600 including a plurality of icons into a screen 610 upon the occurrence of a screen reconfiguration event. Once, as a result of the screen reconfiguration event, some of the plurality of icons that do not meet a predefined screen reconfiguration condition are filtered out from the screen 600, the remaining icons may be rearranged, or the size, shape and/or color of the remaining icons may be changed.

Referring to FIGS. 14(a) through 14(c), the controller 180 can apply a screen effect to alert the user to the occurrence of a screen reconfiguration event. More specifically, referring to FIGS. 14(a) and 14(b), if a screen reconfiguration event occurs when a screen 620 is displayed, the controller 180 can remove or make disappear objects 621, 623 and 625 that do not meet a predefined screen reconfiguration condition. The controller 180 can also make the object appear to fall like leaves on a tree, as indicated by reference numerals 631, 633 and 635. Alternatively, the controller 180 can make the objects 621, 623 and 625 disappear after being displayed as being stripped off from the screen 620, as indicated by reference numerals 641, 643 and 645. Still alternatively, the controller 180 can make the objects 621, 623 and 625 disappear after being displayed as being folded into or unfolded from a certain shape.

Further, objects that do not meet a predefined screen reconfiguration condition are thus filtered out from a screen upon the occurrence of a screen reconfiguration event and can be displayed in a popup window or as on-screen display (OSD) data or icons. Then, if the screen reconfiguration event does not continue for more than a predefined amount of time, the mobile terminal 100 may return to its original screen state before the occurrence of the screen reconfiguration event.

A screen reconfiguration event may also be performed along with other functions such as dialing a phone number or sending a message. For example, when a screen reconfiguration event is performed on a contacts list screen showing a list of contacts, the controller 180 can display a number of application candidates such as making a conference call or sending a message to a group that can be performed in connection with the list of contacts. When a screen reconfiguration event is performed on a photo album screen, a number of application candidates such as sending a multimedia messaging service (MMS) message or email or editing photos that can be performed in connection with the photo album screen may be displayed.

Figure 15:
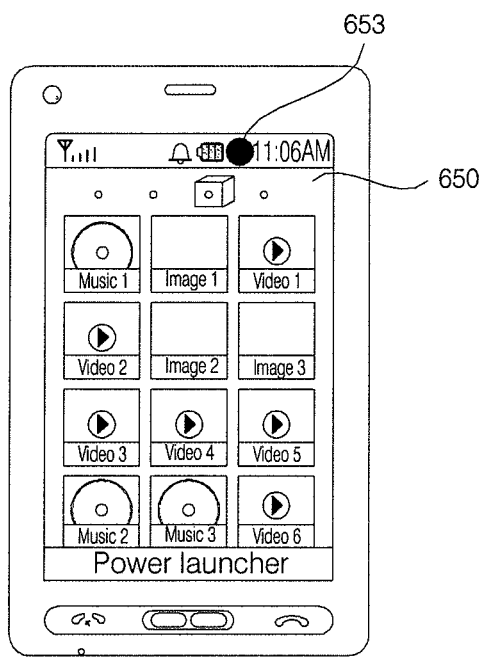
Figure 16:
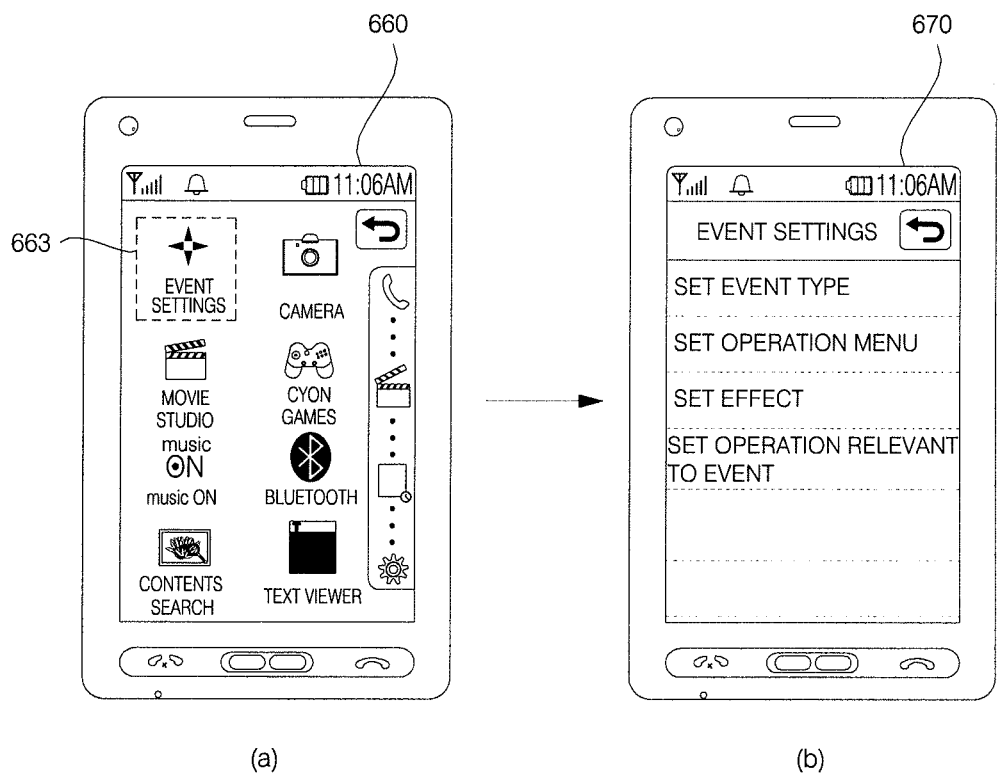

Next, referring to FIG. 15, the controller 180 can display an indicator icon 653 at the top of an operation screen 650 in order to indicate that a screen reconfiguration event can be performed on the operation screen 650. In addition, referring to FIG. 16(a), the controller 180 can provide an icon 663 for setting screen reconfiguration on a menu selection screen 660. Referring to FIG. 16(b), if user selects the icon 663, the controller 180 displays a 'Screen Reconfiguration Settings' screen 670. As shown, the 'Screen Reconfiguration Settings' screen 670 may include a plurality of items such as 'Set Event Type,' 'Set Operation Menu,' 'Set Effect,' and 'Set Operation Relevant to Screen Reconfiguration Event.'

More specifically, the 'Set Event Type' item may be used to select the type of screen reconfiguration event between, for example, a 'blow' signal or a predefined movement of the mobile terminal 100. The 'Set Operation Menu' item may be used to select an operation menu to be reconfigured upon the occurrence of a screen reconfiguration event, and the 'Set Operation Menu' item may also be used to select one or more operations to be performed according to the intensity of a screen reconfiguration event and the number of screen reconfiguration events occurred.

Further, the 'Set Effect' item may be used to set a vibration effect, a sound effect and/or a screen effect to be applied during the reconfiguration of a screen upon the occurrence of a screen reconfiguration event. The 'Set Effect' item may also be used to set a screen effect to be applied to each object to be removed or to be replaced by another object upon the occurrence of a screen reconfiguration event. In addition, the 'Set Operation Relevant to Screen Reconfiguration Event' item may be used to set an operation to be performed in connection with a screen reconfiguration event, and the 'Screen Reconfiguration Settings' screen 670 can provide various settings options regarding a screen reconfiguration event, other than those set forth herein.

The mobile terminal and corresponding method according to embodiments of the present invention are not restricted to the exemplary embodiments set forth herein. Therefore, variations and combinations of the exemplary embodiments set forth herein may fall within the scope of the present invention. Further, the present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and data transmission through the Internet. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to embodiments of the present invention, it is possible to reconfigure a screen by removing objects that do not meet a predefined screen reconfiguration condition from the screen in response to a predefined movement of a mobile terminal or a 'blow' signal, which is classified as a screen reconfiguration event. Therefore, the user can effectively reconfigure a screen only with desired objects and thus effectively control the operation of a mobile terminal with convenience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:

displaying, on a display module of the mobile terminal, a first screen corresponding to a current operating mode and including a plurality of objects relevant to the current operating mode;

providing a menu for allowing a user to select a type of screen reconfiguration event, the type of screen reconfiguration event selected from a predefined movement of a main body of the mobile terminal and a blow signal being obtained by blowing onto the mobile terminal;

receiving an input signal indicating the selected screen reconfiguration event has occurred on the mobile terminal;

reconfiguring, via a controller on the mobile terminal, the first screen by removing at least one of the plurality of objects that do not meet a predefined screen reconfiguration condition from the first screen; and displaying a second screen obtained by the reconfiguration of the first screen on the display module in response to the received input signal, the second screen including objects that meet the predefined screen reconfiguration condition.

2. The method of claim 1, further comprising:
applying at least one of a sound effect and a haptic effect in connection with reconfiguring the first screen.

3. The method of claim 1, further comprising:
changing at least one of a size, shape and color of objects included in the second screen.

4. The method of claim 1, wherein the input signal is generated based on a motion sensor including in the mobile terminal detecting the movement of the main body.

5. The method of claim 1, further comprising:
providing a prompt for setting the predefined screen reconfiguration condition in advance.

6. The method of claim 1, further comprising:
displaying an icon indicating that the first screen can be reconfigured.

7. The method of claim 1, further comprising:
modifying the predefined screen reconfiguration condition according to a number of screen reconfiguration events performed.

8. The method of claim 1, wherein the first screen corresponds to one of a) a list of contacts, b) a list of calls, c) a list of messages or emails, and d) a list of multimedia files.

9. The method of claim 8, wherein the second screen respectively corresponds to one of a) a list of favorite or added contacts, b) a list of frequent or predetermined number of calls, c) a list of predetermined received or sent messages or emails, and d) a list of predetermined multimedia files.

10. A mobile terminal, comprising:

a display module configured to display a first screen corresponding to a current operating mode and including a plurality of objects relevant to the current operating mode;

an input unit configured to provide a menu for allowing a user to select a type of screen reconfiguration event, the type of screen reconfiguration event selected from a predefined movement of a main body of the mobile terminal and a blow signal being obtained by blowing onto the mobile terminal to receive an input signal indicating the selected screen reconfiguration event has occurred on the mobile terminal;

a controller configured to reconfigure the first screen by removing at least one of the plurality of objects that do not meet a predefined screen reconfiguration condition from the first screen, and to control the display module to display a second screen obtained by the reconfiguration of the first screen on the display module in response to the received input signal, the second screen including objects that meet the predefined screen reconfiguration condition.

11. The mobile terminal of claim 10, further comprising: an output unit configured to apply at least one of a sound effect and a haptic effect in connection with reconfiguring the first screen.

12. The mobile terminal of claim 10, wherein the controller is further configured to change at least one of a size, shape and color of objects included in the second screen.

13. The mobile terminal of claim 10, wherein the input signal is generated based on a motion sensor including in the mobile terminal detecting the movement of the main body.

14. The mobile terminal of claim 10, wherein the controller is further configured to provide a prompt for setting the predefined screen reconfiguration condition in advance.

15. The mobile terminal of claim 10, wherein the controller is further configured to control the display module to display an icon indicating that the first screen can be reconfigured.

16. The mobile terminal of claim 10, wherein the controller is further configured to modify the predefined screen reconfiguration condition according to a number of screen reconfiguration events performed.

17. The mobile terminal of claim 10, wherein the first screen corresponds to one of a) a list of contacts, b) a list of calls, c) a list of messages or emails, and d) a list of multimedia files.

18. The mobile terminal of claim 17, wherein the second screen respectively corresponds to one of a) a list of favorite or added contacts, b) a list of frequent or predetermined number of calls, c) a list of predetermined received or sent messages or emails, and d) a list of predetermined multimedia files.

19. The method of claim 1, wherein the objects that meet the predefined screen reconfiguration condition are displayed in a popup window or as on-screen display (OSD) data or icons on the second screen.

20. The method of claim 1, wherein the screen reconfiguration event is performed along with other functions.

21. The method of claim 20, further comprising: when the screen reconfiguration event is performed on a contacts list screen, making a conference call or sending a message to a group including contacts that meet the predefined screen reconfiguration condition.

22. The method of claim 20, further comprising: when the screen reconfiguration event is performed on a photo album screen, sending a multimedia messaging service (MMS) message or an email to transmit photos that meet the predefined screen reconfiguration condition, or editing photos that meet the predefined screen reconfiguration condition.

23. The mobile terminal of claim 10, wherein the objects that meet the predefined screen reconfiguration condition are displayed in a popup window or as on-screen display (OSD) data or icons on the second screen.

24. The mobile terminal of claim 10, wherein the screen reconfiguration event is performed along with other functions.

25. The mobile terminal of claim 24, wherein when the screen reconfiguration event is performed on a contacts list screen, the controller makes a conference call or sends a message to a group including contacts that meet the predefined screen reconfiguration condition.

26. The mobile terminal of claim 24, wherein when the screen reconfiguration event is performed on a photo album screen, the controller sends a multimedia messaging service (MMS) message or an email to transmit photos that meet the predefined screen reconfiguration condition, or edits photos that meet the predefined screen reconfiguration condition.

27. The method of claim 1, wherein a number of objects that meet the predefined screen reconfiguration condition is gradationally varied according to a number of times or an intensity of the occurred screen reconfiguration event.

28. The mobile terminal of claim 10, wherein a number of objects that meet the predefined screen reconfiguration condition is gradationally varied according to a number of times or an intensity of the occurred screen reconfiguration event.

* * * * *